United States Patent
Li et al.

(10) Patent No.: US 12,274,957 B2
(45) Date of Patent: Apr. 15, 2025

(54) PROCESS FOR TREATING AGED OIL BY ELECTRON BEAM IRRADIATION

(71) Applicant: Shandong Hygiya Envil Protection Equip Co., Ltd., Zaozhuang (CN)

(72) Inventors: Yi Li, Haikou (CN); Xiaohui Fan, Haikou (CN); Liping Wei, Haikou (CN); Xudong Qing, Haikou (CN); Yuan Fan, Haikou (CN); Guangchuan Liu, Haikou (CN); Dong Yang, Haikou (CN); Xiuding Hu, Haikou (CN); Haitao Cui, Haikou (CN); Liqing Wang, Haikou (CN); Lingli Ren, Haikou (CN)

(73) Assignee: Shandong Hygiya Envtl Protection Equip Co., Ltd., Zaozhuang (CN)

( * ) Notice: Subject to any disclaimer, the term of this patent is extended or adjusted under 35 U.S.C. 154(b) by 0 days.

(21) Appl. No.: 17/791,845

(22) PCT Filed: Apr. 25, 2022

(86) PCT No.: PCT/CN2022/088870
§ 371 (c)(1),
(2) Date: Jul. 8, 2022

(87) PCT Pub. No.: WO2023/071092
PCT Pub. Date: May 4, 2023

(65) Prior Publication Data
US 2024/0123372 A1    Apr. 18, 2024

(30) Foreign Application Priority Data

Oct. 25, 2021 (CN) .......................... 202111237130.3

(51) Int. Cl.
*B01D 17/06* (2006.01)
*B01D 17/02* (2006.01)
(Continued)

(52) U.S. Cl.
CPC ............. *B01D 17/06* (2013.01); *B01D 17/04* (2013.01); *C02F 1/302* (2013.01); *C02F 1/305* (2013.01);
(Continued)

(58) Field of Classification Search
CPC .... B01D 17/06; B01D 17/04; B01D 17/0214; B01D 17/02; C02F 1/302; C02F 1/305;
(Continued)

(56) References Cited

U.S. PATENT DOCUMENTS

| 4,581,112 A | * | 4/1986 | Mintz | ................... | B01D 17/06 |
| | | | | | 204/665 |
| 4,853,507 A | * | 8/1989 | Samardzija | ............ | H05B 6/802 |
| | | | | | 219/687 |

(Continued)

FOREIGN PATENT DOCUMENTS

| CN | 108423897 A | * | 8/2018 | |
| CN | 111099799 A | * | 5/2020 | .............. C02F 11/00 |

*Primary Examiner* — Liam Royce

(74) *Attorney, Agent, or Firm* — Patterson + Sheridan, LLP

(57) ABSTRACT

A process for treating aged oil by electron beam irradiation is disclosed, comprising the following steps: step 1, homogenizing the aged oil and then feeding the aged oil into a distributor; step 2, forming a liquid layer having a certain thickness on the distributor; step 3, installing and debugging an electron beam irradiation device on the distributor; step 4, installing and debugging a phased-array microwave emitter on the distributor after installing and debugging the electron beam irradiation device; step 5, turning on the electron beam irradiation device and the phased-array microwave emitter; and step 6, dividing the treated aged oil and then allowing the aged oil after dividing to enter an oil pool and a water pool for standing. Oil flows out from an (Continued)

upper layer of the oil pool, a lower layer of the oil pool flows back to an aged oil storage pool.

9 Claims, 4 Drawing Sheets

(51) Int. Cl.
  *B01D 17/04* (2006.01)
  *C02F 1/30* (2023.01)
  *C02F 1/40* (2023.01)
  *C10G 33/02* (2006.01)
  *C02F 101/32* (2006.01)
(52) U.S. Cl.
  CPC ............... *C02F 1/40* (2013.01); *C10G 33/02* (2013.01); *B01D 17/0214* (2013.01); *C02F 2101/32* (2013.01); *C10G 2300/1007* (2013.01)
(58) Field of Classification Search
  CPC ........ C02F 1/40; C02F 2101/32; C10G 33/02; C10G 2300/1007; C10G 32/02; B01J 19/08; B01J 19/126
  See application file for complete search history.

(56) References Cited

U.S. PATENT DOCUMENTS

| | | | |
|---|---|---|---|
| 2008/0221226 A1* | 9/2008 | Coutinho | C10G 32/02 |
| | | | 516/194 |
| 2016/0102284 A1* | 4/2016 | Lipkens | C12M 35/04 |
| | | | 435/308.1 |

* cited by examiner

Phased-array microwave emitter

PROCESS FOR TREATING AGED OIL BY ELECTRON BEAM IRRADIATION

CROSS REFERENCE TO RELATED APPLICATION

This application claims the priority of Chinese patent application No. 202111237130.3 filed on Oct. 25, 2021, entitled "A process for treating aged oil by electron beam irradiation", the disclosure of which is incorporated by reference herein in its entirety as part of the present application.

TECHNICAL FIELD

The present disclosure relates to the technical field of aged oil treatment, and in particular relates to a process for treating aged oil by electron beam irradiation.

BACKGROUND ART

Aged oil is mainly derived from complex water-in-oil and oil-in-water emulsions containing surfactants and others produced in crude oil storage, oil sludge and sewage treatment. The aged oil has many shortcomings, for example, the aged oil may lead to the tripping of an electric dehydrator and other production accidents in a crude oil treatment system due to strong electrical conductivity, the shortening of the service life of a crude oil treatment unit due to high corrosiveness, and the increasing of treatment cost due to the increased use of treatment chemicals. Meanwhile, the aged oil is strong in stability and occupies a large space in the crude oil treatment unit. Therefore, the emulsion breaking and oil-water separation of the aged oil have always been an urgent problem to be solved.

After the aged oil is treated, considerable economic and social benefits can be obtained. The currently used aged oil treatment methods include a physical method, a chemical method, and a combined method, and each of the above three treatment methods has its own advantages and disadvantages. However, regardless of the method, the main principle for emulsion breaking is to break the stability of the emulsion. Various macroscopic methods ultimately work on the microscopic molecular clusters and molecules: for example, the heating increases molecular thermal motion, electric fields break the interfacial charge balance, force fields increase centrifugal force through the density difference between water and oil so as to break the balance, and electromagnetic and acoustic fields also work directly on the molecular clusters and molecules. While microscopic methods are as follows: such as chemical additives, the electrochemical properties of the aged oil molecular clusters are changed directly by the added additive molecules, thus destabilizing the aged oil. However, the adoption of the chemical additives may cause secondary emulsification and secondary pollution of the aged oil.

An electron beam technology is a method worthy to be considered if it is possible to change the electrochemical properties in the aged oil molecular clusters and molecules on a microscopic level without using chemical reagents. The electron beam directly changes the charge distribution at the interface of molecular clusters that have reached charge balance in the aged oil from the microscopic level, and simultaneously enables the relevant water molecules to react with the molecules capable of reacting at the corresponding energy level to turn the relevant water molecules into charged particles without adding chemical reagents, thus achieving the purposes of rapid instability and emulsion breaking. After emulsion breaking, a water phase and an oil phase needs to be rapidly separated. However, a conventional sedimentation method is time-consuming, and a centrifuge method is higher in energy consumption and relatively complex in operation and regulation. Therefore, a rapid and universal method is required for separation.

The laser control is also used in separation of isotopes in nuclear science research, and has been increasingly used in recent decades. The use of phased-array microwaves for the separation of water-containing mixed phases is a relatively large leap, as well as the application of an advanced separation technology in traditional heavy industry.

SUMMARY

An objective of the present disclosure is to provide a process for treating aged oil by electron beam irradiation so as to solve the technical problem above. In the present disclosure, an electron beam irradiation technology is used for the emulsion breaking of the aged oil, and then a phased-array microwave technology is used for oil-water separation. This method does not use the chemical agent, but directly works on microscopic molecules with high efficiency.

To achieve the objective, the present disclosure adopts the following technical solutions:
  step 1: homogenizing the aged oil and then feeding the aged oil into a distributor;
  step 2: forming a liquid layer having a certain thickness on the distributor;
  step 3: installing and debugging an electron beam irradiation device on the distributor;
  step 4: installing and debugging a phased-array microwave emitter on the distributor after installing and debugging the electron beam irradiation device;
  step 5, turning on the electron beam irradiation device, wherein debugging contents comprise: an aged oil flow velocity, an electron beam energy value, a beam intensity, and an irradiation dosage range;
  step 6: turning on the phased-array microwave emitter, wherein debugging contents comprise: a phased-array microwave power density, a phased-array microwave frequency, and a phased-array microwave irradiation angle;
  step 7, dividing the treated aged oil by a divider and then allowing the aged oil after dividing to enter an oil pool and a water pool for standing, wherein oil flows out from an upper layer of the oil pool, a lower layer of the oil pool flows back to an aged oil storage pool, water flows out from a lower layer of the water pool, and an upper layer of the water pool flows back to the aged oil storage pool; detecting the water content of the oil flowing out from the oil pool, discharging the oil from the system if the water content is qualified; or if the water content is unqualified, repeating the step 5 and step 6, and adjusting the divider at the same time until the water content of the oil flowing out from the oil pool is qualified.

Preferably, in the step 2, the liquid layer has a thickness of 1 cm to 2 cm.

Preferably, in the step 3, the debugging contents of debugging the electron beam irradiation device comprise: an electron beam energy value of 0.5 to 2 MeV, a beam intensity of 10 to 50 mA, and an irradiation dosage range of 0 to 500 kGy.

Preferably, in the step 4, the debugging contents of debugging the phased-array microwave emitter comprise: a phased-array microwave power density of 0 to 10 kw/m$^2$, a phased-array microwave frequency of 2 GHz to 180 GHz, and a phased-array microwave plate irradiation angle of 10 to 80 degrees.

Preferably, in the step 7, the time for standing the oil flowing out from the oil pool is 0 to 4 h, and the time for standing the water flowing out from the water pool is 0 to 4 h.

Preferably, according to a width of an electron beam irradiation window of the electron beam irradiation device, a width of the distributor is adjusted to enable a width of an aged oil fluid to be consistent with the width of the irradiation window, and a width of the phased-array microwave plate is adjusted to be consistent with the width of the aged oil fluid at the rear end of the distributor.

Preferably, the divider carries out dividing according to oil-water density stratification to ensure that the water content of the oil layer is reduced to the minimum as much as possible.

Preferably, a space at which the aged oil reacts with an electron beam emitted by the electron beam irradiation device is filled with inert gas.

Preferably, an electric field is added in a space at which the phased-array microwave emitted by the phased-array microwave emitter reacts with the aged oil to improve the treatment effect.

Compared with the prior art, the present disclosure has the following advantages:

1. An objective of the present disclosure is to provide a treatment method for achieving emulsion breaking and oil-water separation of aged oil, which is conducive to solving the problems of secondary emulsification and secondary pollution of the aged oil caused by a currently used chemical additive method.
2. The basic principle of the present disclosure is as follows: the treatment of aged oil by electron beam irradiation is achieved through direct interaction and indirect interaction between the high-energy electron beam and the molecular clusters and the molecules in the aged oil.

The direct action refers to that the high-energy electron in an electron beam ray directly interacts with the molecular clusters and molecules in the aged oil to destroy charge balance at an emulsion interface layer, thus achieving the purpose of emulsion breaking.

The indirect action includes that the water molecules are subjected to electron beam irradiation to generate a plurality of highly active particles, which have strong oxidizing properties and react with a plurality of chemicals, such as surfactants, present in the aged oil to enable the aged oil to be degraded or lose the ability to form a stable transition layer.

3. In the present disclosure, the water molecules are separated from an oil-water mixture by using a phased-array microwave technology. As water molecules have an electric dipole moment, when the microwave frequency is lower than the resonance frequency, the electric dipole moment force is able to push the molecules to a region with weak light intensity; on the contrary, when the microwave frequency is higher than the resonance frequency, the electric dipole moment force is able to push the molecules to a region with weak light intensity. Meanwhile, the molecules may absorb and emit photons, in a cycle of absorption and spontaneous radiation, the molecules gain momentum and are subjected to a force along a light wave propagation direction that makes the molecules move to a desired direction.

For the disadvantages in the current aged oil treatment method, the aged oil is treated using an electron beam irradiation technology and a phased-array microwave technology without using external source heating and centrifugal separation means, thus the treatment energy consumption for the aged oil is greatly reduced. As the core device has no rotating parts, the operation is simple, and the failure rate is reduced. There is no need to add chemical additives, such that the secondary pollution is reduced, and environmental protection is achieved. Due to the fact that the working principle of the present disclosure is universal for a wide range of aging oil, the development time required when employing the chemicals is reduced, and the complexity is lowered.

Figure 1:
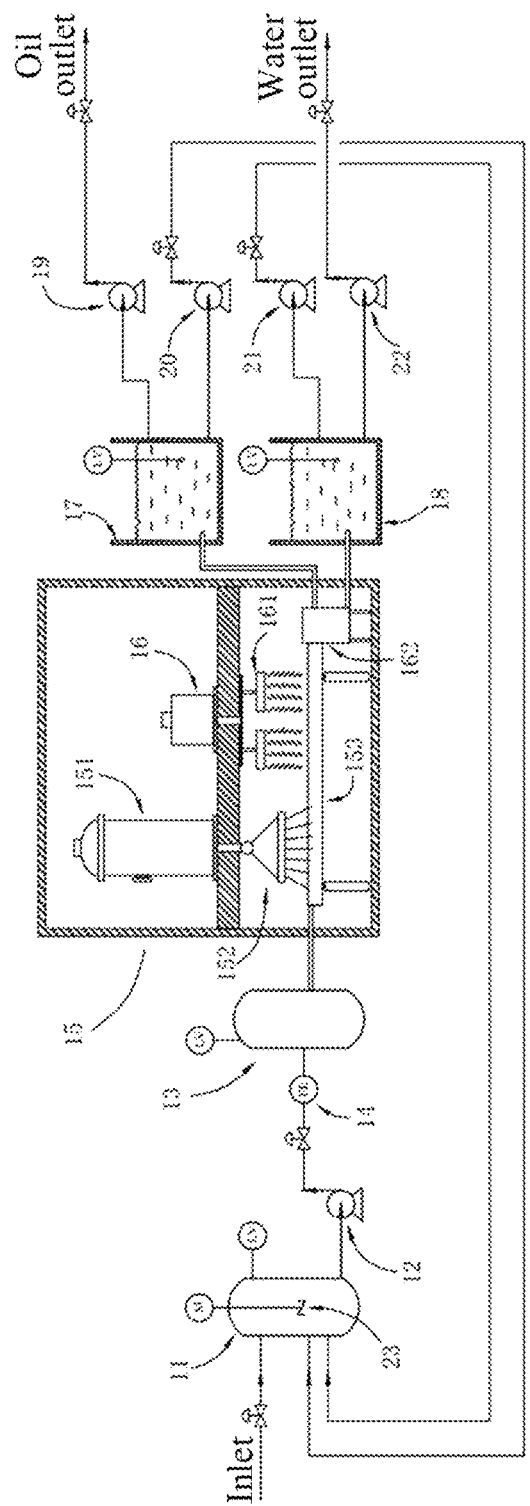
FIG. 1 is a schematic diagram of a process flow of the present disclosure.

In the drawings: 11—homogenizing tank; 12—feed pump; 13—buffer tank; 14—flowmeter; 15—electron beam irradiation chamber; 16—phased-array microwave generator; 17—oil pool; 18—water pool; 19—discharge pump I; 20—discharge pump II; 31—discharge pump III; 22—discharge pump IV; 23—stirrer; 151—electron accelerator; 152—electron irradiation window; 153—distributor; 161—phased-array microwave plate; 162—divider.

DETAILED DESCRIPTION OF THE EMBODIMENTS

To make the objective, technical solutions and advantages of the present disclosure more clearly understood, the following further describes the present disclosure in detail with reference to the accompanying drawings and embodiments. The specific embodiments described below are intended only to explain the present disclosure rather than limiting the same.

As shown in FIG. 1, in the step 1, aged oil enters a homogenizing tank 11 through an inlet, is pumped into a buffer tank 13 by a feed pump 12 after being stirred and homogenized by a stirrer 23, and then automatically flows into a distributor 153 from the buffer tank 13. The distributor is located at a lower portion of an electron beam irradiation chamber 15. The electron beam irradiation chamber 15 is divided into an upper portion and the lower portion.

In the step 2, the aged oil from the buffer tank 13 forms a liquid layer having a certain thickness on the distributor 153.

In the step 3, an electron accelerator 151 is installed and debugged above the distributor 153, i.e., at the upper half portion of the electron beam irradiation chamber15, and is connected to an electron irradiation window 152 located at the lower half portion of the electron beam irradiation chamber 15.

In the step 4, above the distributor 153, a phased-array microwave emitter 16 is installed at a rear portion of the electron accelerator 151 to be connected to a phased-array microwave plate 161, wherein the phased-array microwave generator is located above the phased-array microwave plate.

In the step 5, the electron accelerator 151 is turned on, the debugging contents comprise: an aged oil flow velocity, an electron beam energy value, a beam intensity, and an irradiation dosage range.

In the step 6, the phased-array microwave emitter 16 is turned on, the debugging contents comprise: a phased-array microwave power density, a phased-array microwave frequency, and a phased-array microwave irradiation angle.

In step 7, the treated aged oil is divided by a divider 162 and then enters an oil pool 17 and a water pool 18 for standing. Oil flows out from an upper layer of the oil pool 17, and the liquid at a lower layer of the oil pool flows back to an aged oil homogenizing tank 11; water flows out from a lower layer of the water pool 18, and the liquid at an upper layer of the water pool flows back to the aged oil homogenizing tank 11. The water content of the oil flowing out from the oil pool 17 is detected, if the water content is qualified, the oil is discharged from the system; and if the water content is unqualified, the step 5 and step 6 are repeated, and the divider 162 is adjusted at the same time until the water content of the oil flowing out from the oil pool 17 is qualified.

In the present disclosure, in the step 2, the thickness of the liquid layer of the aged oil in the distributor 153 is preferably 1 cm to 2 cm.

In the present disclosure, in the step 3, the irradiation in the electron accelerator 151 employs an electron beam energy value of preferably 0.5 to 2 MeV, a beam intensity of preferably 10 to 50 mA, and an irradiation dosage range of preferably 0 to 500 kGy.

In the present disclosure, in the step 4, the phased-array microwave emitter 16 employs a phased-array microwave power density of preferably 0 to 10 kw/m$^2$, a phased-array microwave frequency of preferably 2 GHz to 180 GHz, and an adjustable irradiation angle $\Omega$ between the phased-array microwave plates 161 of preferably 10 to 80 degrees.

In the present disclosure, in the step 7, the oil obtained through the dividing of the divider 162 is stored in an oil pool 17 for a liquid standing time of preferably 0 to 4 h, and the water obtained through the dividing of the divider 162 is stored in a water pool 18 for a liquid standing time of preferably 0 to 4 h.

In the present disclosure, in accordance with a width of the electron irradiation window 152, a width of the distributor 153 is preferably adjusted to enable a fluid width of the aged oil to be consistent with the width of the electron irradiation window 152. An irradiation width of the phased-array microwave plate 161 is preferably adjusted to be consistent with the fluid width of the aged oil in the distributor 153.

In the present disclosure, the divider 162 carries out dividing according to oil-water density stratification at an outlet of the distributor 153 to ensure that the water content of the oil layer is reduced to the minimum as much as possible.

In the present disclosure, a space at which the aged oil reacts with an electron beam emitted from the electron beam irradiation device should be filled with inert gas. That is, the electron beam irradiation chamber 15 should be filled with the inert gas to prevent possible risk.

Figure 4:
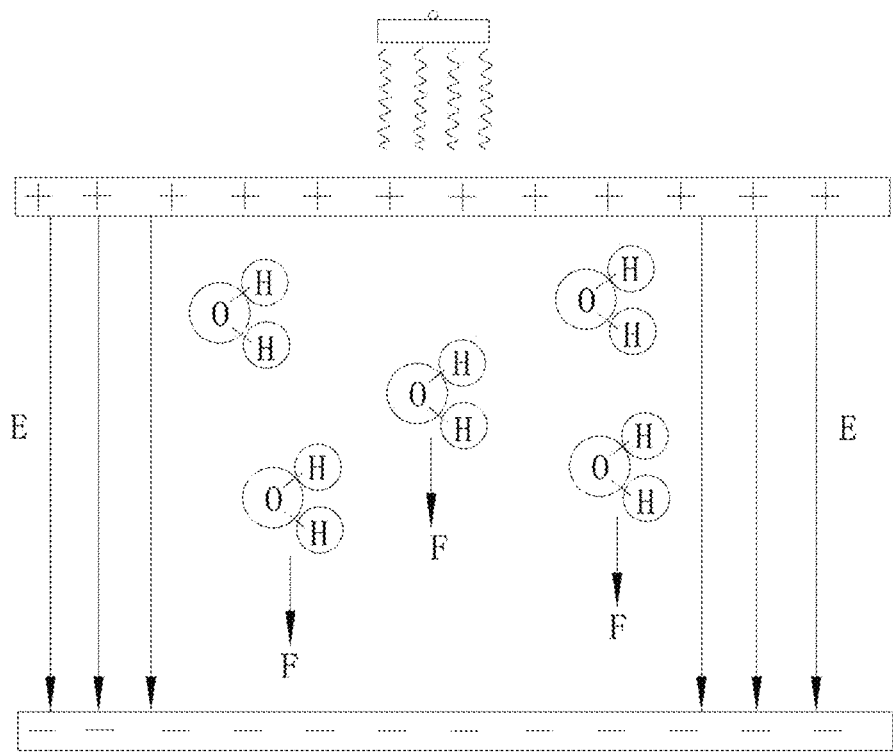
FIG. 4 is a variation diagram of aged oil treatment capacity of the present disclosure along with a treatment mode.
Figure 4:
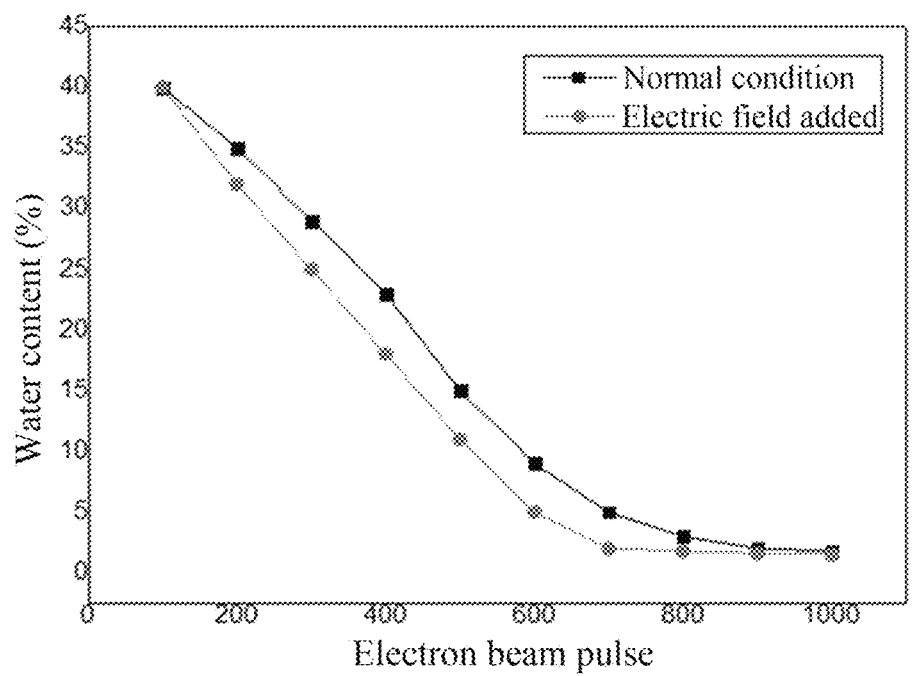

In the present disclosure, an electric field can be added in a space at which the phased-array microwave emitted from the phased-array microwave emitter reacts with the aged oil to improve the treatment effect. As shown in FIG. 4, that is, an electric field can be added between the phased-array microwave plate 161 and the distributor 153 to improve the speed of oil-water separation.

Figure 2:
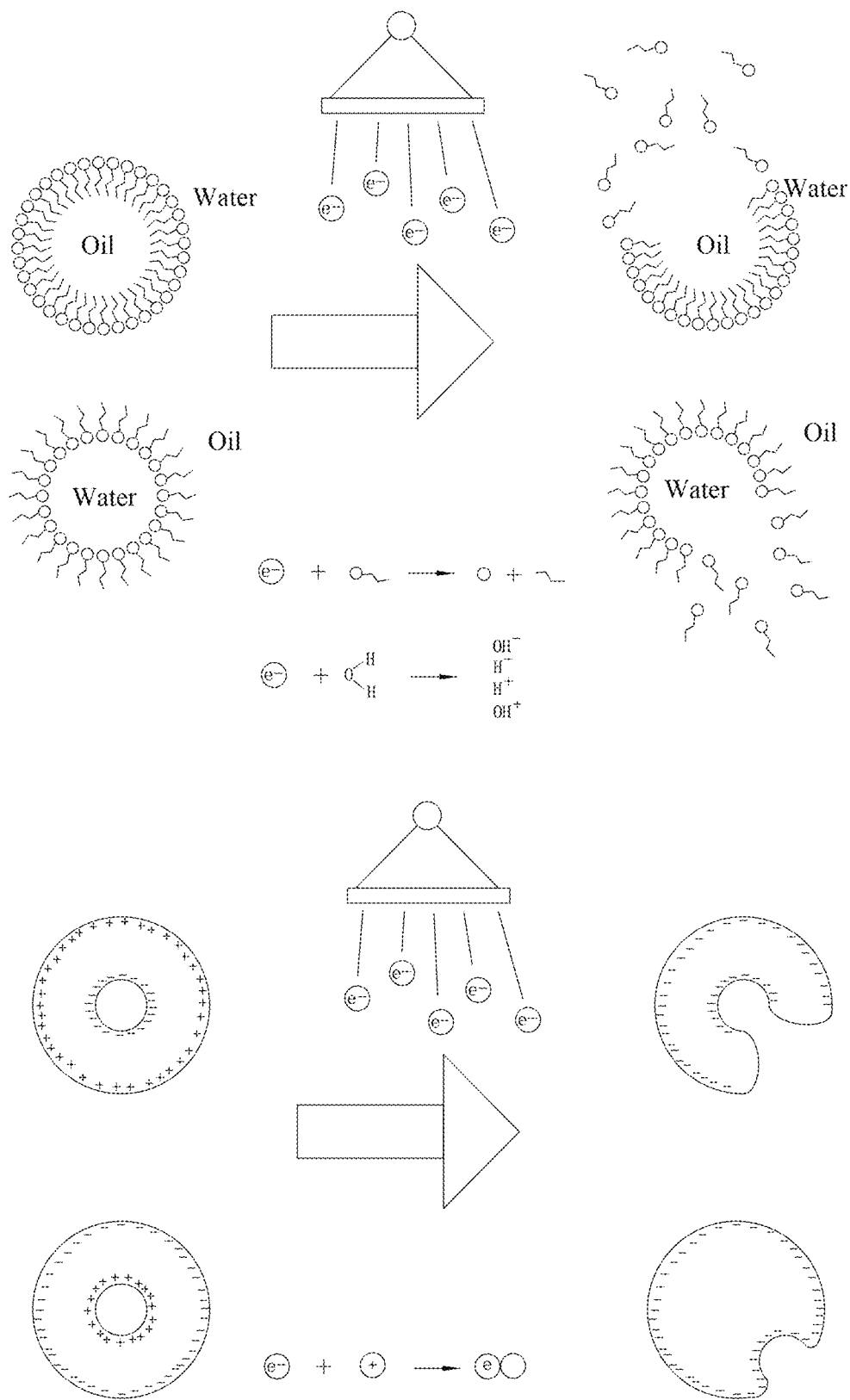
FIG. 2 is mechanism diagram of treating aged oil by electron beam of the present disclosure.

In this embodiment, the electron beam transfers energy to molecules and molecular clusters in the aged oil through a particularly complex reaction with the aged oil in the distributor 153. As shown in (a) in FIG. 2, due to the high energy of electrons, long chain molecules such as surfactants and polymeric petroleum hydrocarbons molecular chains present in the aged oil itself are able to break, thus destroying a formation mechanism of an emulsion stabilization layer. Meanwhile, small molecules in the aged oil are subjected to radiolysis to generate a series of free radicals and ions, including electrons, hydrogen radicals, hydroxyl radicals, oxygen radicals, H+ ions, OH— ions, and the like. These electrons, hydrogen atoms and hydroxyl radicals can react with chemical additives, surfactants present in the aged oil itself due to their strong redox properties, which also destroy the stability of the emulsion.

In addition, according to an electric double layer theory of colloids, the negatively charged and positively charged molecular clusters form a stable electric double layer. Conventional methods such as adding chemicals and flocculants can change the electric potential of the electric double layer and make the electric double layer agglomerate, thus separating oil from water. As shown in (b) in FIG. 2, the negatively charged high-energy electrons directly work on the electric double layer to change the potential of the electric double layer and to neutralize the positive charge in the electric layer, such that the electric double layer are negatively charged. Due to the instability of the repulsive force of the same charge, small oil beads or small water beads at the center of the electric double layer are separated from the electric double layer, and the purpose of emulsion breaking can be achieved without adding chemicals and flocculants.

As above, after the destabilization and emulsion breaking of the aged oil, the stabilization layer has been destroyed, water and oil are present in a form of free state. In order to accelerate the process of oil-water separation and aggregation, a phased-array microwave technology is used in this embodiment. As water molecules have an electric dipole moment, when the microwave frequency is lower than the resonance frequency, the electric dipole moment force is able to push the molecules to a region with weak light intensity; on the contrary, when the microwave frequency is higher than the resonance frequency, the electric dipole moment force is able to push the molecules to a region with weak light intensity. Meanwhile, the molecules may absorb and emit photons, in a cycle of absorption and spontaneous radiation, the molecules gain momentum and are subjected to a force along a light wave propagation direction that makes the molecules move to a desired direction.

Figure 3:
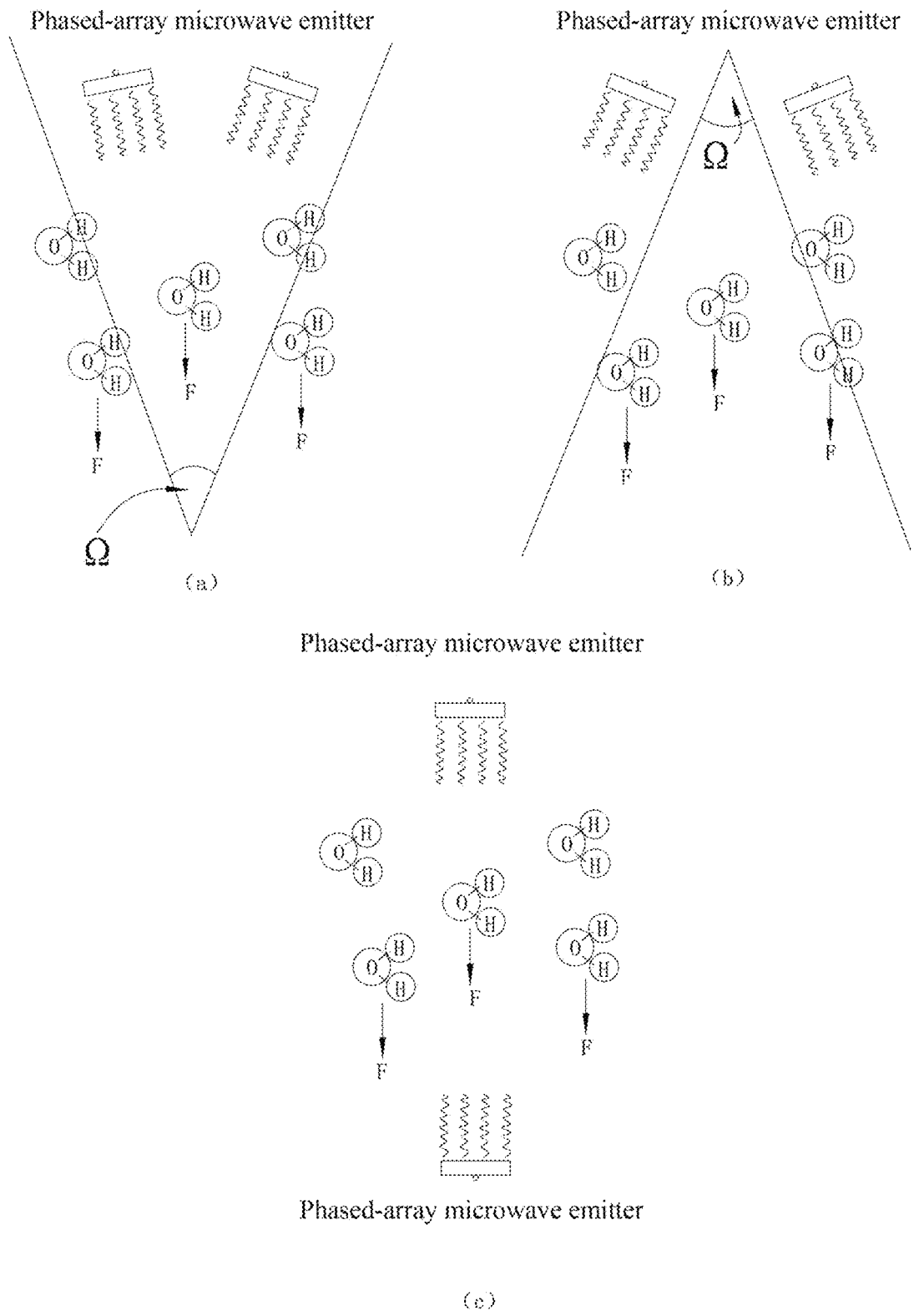
FIG. 3 is a mechanism diagram of treating aged oil by phased-array microwave of the present disclosure.

As shown in (a) in FIG. 3, an angle $\Omega$ of the phased-array microwave plate 161 is adjusted to make the light intensity stronger at the lower side, if the microwave frequency is adjusted to be higher than the resonance frequency, the water molecules may be subjected to a downward acting force. As shown in (b) in FIG. 3, the angle $\Omega$ of the phased-array microwave plate 161 is adjusted to make the light intensity weaker at the lower side, if the microwave frequency is adjusted to be lower than the resonance frequency, the water molecules may be subjected to a downward acting force. As shown in (c) in FIG. 3, the adjusted phased-array microwave plates 161 are respectively placed above and below the aged oil to adjust the microwave frequency, thus making the water molecules subjected to a downward joint force. Under the phased-array microwave action of these several ways, the water molecules in a disperse state are gradually gathered together to achieve the separation of oil and water. By changing the intensity of the phased-array microwave, the oil-water separation speed can be adjusted. As the heat effect of the phased-array microwave is increased as the light intensity increases, the most appropriate light intensity needs to be optimally selected between the increasing of the oil-water separation speed and the reduction of the heat effect of the phased-array microwave, thus preventing the disturbance caused by the heat effect from destroying the oil-water separation effect.

As above, after being subjected to high-energy electron beam irradiation, the molecules and molecular clusters in the aged oil are subjected to radiolysis to generate complex free radicals and ions. Meanwhile, under the action of the electron beam, part of molecules prefers to be negatively charged. In the phased-array microwave treatment process, an electric field can be added between the phased-array microwave plate 161 and the distributor 153, the negatively charged molecules and molecular clusters may generate a downward acting force by adjusting an electric field direction, thus increasing the treatment efficiency of oil-water separation.

The enhancement of the oil-water separation treatment effect by adding the electric field is shown in FIG. 4. For the selected aged oil, under the same treatment quantity and other treatment conditions, the water content of the oil flowing out from the oil pool 17 can be reduced by at most 40% by adding the electric field. The electron beam may be in a form of pulsed or continuous radiation. In practical applications, the electron beam is mostly operated in the pulsed mode for various reasons. In FIG. 4, the influence degree of adding the electric field on the oil-water separation treatment effect can be measured by taking the number of pulses of the electron beam as a counting mode.

The above described is only a preferred embodiment of the present invention. It should be noted that for a person of ordinary skill in the art, numerous improvements and embellishments can be made without departing from the principles of the present invention, and these improvements and embellishments shall also be considered as the scope of protection of the present invention.

What is claimed is:

1. A process for treating aged oil by electron beam irradiation, comprising the following steps:
   step 1: homogenizing the aged oil and then feeding the aged oil into a distributor;
   step 2: forming a liquid layer having a certain thickness on the distributor;
   step 3: installing and debugging an electron beam irradiation device on the distributor;
   step 4: installing and debugging a phased-array microwave emitter on the distributor after installing and debugging the electron beam irradiation device;
   step 5: turning on the electron beam irradiation device, wherein debugging contents comprise: an aged oil flow velocity, an electron beam energy value, a beam intensity, and an irradiation dosage range;
   step 6: turning on the phased-array microwave emitter, wherein debugging contents comprise: a phased-array microwave power density, a phased-array microwave frequency, and a phased-array microwave irradiation angle; and
   step 7: dividing the treated aged oil by a divider and then allowing the aged oil after dividing to enter an oil pool and a water pool for standing, wherein oil flows out from an upper layer of the oil pool, a lower layer of the oil pool flows back to an aged oil storage pool, water flows out from a lower layer of the water pool, and an upper layer of the water pool flows back to the aged oil storage pool; detecting the water content of the oil flowing out from the oil pool, discharging the oil from the system if the water content is qualified; or if the water content is unqualified, repeating the step 5 and step 6, and adjusting the divider at the same time until the water content of the oil flowing out from the oil pool is qualified.

2. The process for treating aged oil by electron beam irradiation according to claim 1, wherein in the step 2, the liquid layer has a thickness of 1 cm to 2 cm.

3. The process for treating aged oil by electron beam irradiation according to claim 1, wherein in the step 3, the debugging contents of debugging the electron beam irradiation device comprise: an electron beam energy value of 0.5 to 2 MeV, a beam intensity of 10 to 50 mA, and an irradiation dosage range of 0 to 500 kGy.

4. The process for treating aged oil by electron beam irradiation according to claim 1, wherein in the step 4, the debugging contents of debugging the phased-array microwave emitter comprise: a phased-array microwave power density of 0 to 10 kw/m$^2$, a phased-array microwave frequency of 2 GHz to 180 GHZ, and a phased-array microwave plate irradiation angle of 10 to 80 degrees.

5. The process for treating aged oil by electron beam irradiation according to claim 1, wherein in the step 7, the time for standing the oil flowing out from the oil pool is 0 to 4 h, and the time for standing the water flowing out from the water pool is 0 to 4 h.

6. The process for treating aged oil by electron beam irradiation according to claim 1, wherein, according to a width of an electron beam irradiation window of the electron beam irradiation device, a width of the distributor is adjusted to enable a width of an aged oil fluid to be consistent with the width of the irradiation window, and a width of a phased-array microwave plate is adjusted to be consistent with the width of the aged oil fluid at the rear end of the distributor.

7. The process for treating aged oil by electron beam irradiation according to claim 1, wherein the divider carries out dividing according to oil-water density stratification to ensure that the water content of an oil layer is reduced to the minimum.

8. The process for treating aged oil by electron beam irradiation according to claim 1, wherein a space at which the aged oil reacts with an electron beam emitted by the electron beam irradiation device is filled with inert gas.

9. The process for treating aged oil by electron beam irradiation according to claim 1, wherein an electric field is added in a space at which the phased-array microwave emitted by the phased-array microwave emitter reacts with the aged oil to improve the treatment effect.

* * * * *